United States Patent
Kozono et al.

(10) Patent No.: US 12,357,949 B2
(45) Date of Patent: Jul. 15, 2025

(54) CLEANING METHOD OF MEMBRANE FILTRATION SYSTEM AND MEMBRANE FILTRATION SYSTEM

(71) Applicant: METAWATER Co., Ltd., Tokyo (JP)

(72) Inventors: Hideki Kozono, Tokyo (JP); Nobuhisa Matsushige, Tokyo (JP)

(73) Assignee: METAWATER Co., Ltd., Tokyo (JP)

( * ) Notice: Subject to any disclaimer, the term of this patent is extended or adjusted under 35 U.S.C. 154(b) by 577 days.

(21) Appl. No.: 17/754,676

(22) PCT Filed: Oct. 6, 2020

(86) PCT No.: PCT/JP2020/037910
§ 371 (c)(1),
(2) Date: Apr. 8, 2022

(87) PCT Pub. No.: WO2021/070832
PCT Pub. Date: Apr. 15, 2021

(65) Prior Publication Data
US 2023/0092095 A1    Mar. 23, 2023

(30) Foreign Application Priority Data
Oct. 11, 2019    (JP) ................ 2019-187789

(51) Int. Cl.
*B01D 65/02*    (2006.01)
*C02F 1/44*    (2023.01)

(52) U.S. Cl.
CPC ............ *B01D 65/02* (2013.01); *C02F 1/44* (2013.01); *B01D 2321/04* (2013.01); *B01D 2321/185* (2013.01); *C02F 2303/16* (2013.01)

(58) Field of Classification Search
CPC ............ B01D 65/02; B01D 2321/04; B01D 2321/185; B01D 2313/105; B01D 2313/125; B01D 2313/19; B01D 2313/26; B01D 2317/04; B01D 61/20; C02F 1/44; C02F 2303/16; Y02A 20/131
See application file for complete search history.

(56) References Cited

FOREIGN PATENT DOCUMENTS

| CN | 206700873 U | 12/2017 |
|---|---|---|
| JP | S54109919 U | 8/1979 |
| JP | H0824598 A | 1/1996 |

(Continued)

OTHER PUBLICATIONS

Apr. 12, 2022, International Preliminary Report on Patentability issued in the International Patent Application No. PCT/JP2020/037910.

(Continued)

*Primary Examiner* — Waqaas Ali
(74) *Attorney, Agent, or Firm* — KENJA IP LAW PC (57) ABSTRACT

A cleaning method of a membrane filtration system in which a plurality of modules including an inlet side region and an outlet side region separated by a filtration membrane are connected in parallel by a common blow header pipe in the inlet side region, the method including backwashing and blowing in which after the backwashing is started, gas is introduced into the plurality of modules through a blow header pipe. The method further includes forming, before the blowing is started, a gas layer across an entire longitudinal direction of the blow header pipe.

7 Claims, 7 Drawing Sheets

(56) References Cited

FOREIGN PATENT DOCUMENTS

| | | | |
|---|---|---|---|
| JP | 6362748 B1 | 7/2018 | |
| JP | 2019048251 A * | 3/2019 | |
| JP | 2019093353 A * | 6/2019 | ............ B01D 65/02 |
| KR | 101530298 B1 * | 6/2015 | |
| WO | 2011122289 A1 | 10/2011 | |

OTHER PUBLICATIONS

Dec. 1, 2020, International Search Report issued in the International Patent Application No. PCT/JP2020/037910.
Dec. 6, 2023, Office Action issued by the China National Intellectual Property Administration in the corresponding Chinese Patent Application No. 202080070816.5.
Jan. 9, 2024, Notification of Reasons for Refusal issued by the Japan Patent Office in the corresponding Japanese Patent Application No. 2021-551671.
Jul. 2, 2024, Notification of Reasons for Refusal issued by the Japan Patent Office in the corresponding Japanese Patent Application No. 2021-551671.
Oct. 9, 2023, the Extended European Search Report issued by the European Patent Office in the corresponding European Patent Application No. 20875269.1.

* cited by examiner

CLEANING METHOD OF MEMBRANE FILTRATION SYSTEM AND MEMBRANE FILTRATION SYSTEM

TECHNICAL FIELD

The present disclosure relates to a cleaning method of a membrane filtration system and a membrane filtration system.

BACKGROUND

In general, a water treatment method using membrane filtration is known as a method of separating and removing contaminants from water to be treated in various water treatment systems, such as water treatment systems, sewage treatment systems, industrial water treatment systems, wastewater treatment systems, and seawater desalination systems.

In a water treatment method using membrane filtration, contaminants in the water to be treated adhere to the filtration membrane as filtration continues, resulting in clogging of the filtration membrane and a decrease in filtration performance. Therefore, it is necessary to periodically backwash the filtration membrane to remove the clogging.

Thus, in the conventional membrane filtration system that filters the water to be treated using a filtration membrane, backwash water is periodically passed through a filtration membrane from its outlet side (filtered water side) to the inlet side (water to be treated side) to backwash the filtration membrane. Further, in the conventional membrane filtration system, with the backwash water, a flushing fluid such as compressed gas, etc., is circulated from one side to the other in the inlet side region to remove contaminants, or the like, accumulated on the surface of the inlet side region of the membrane, thereby enhancing the cleaning effect (flushing operation). In the membrane filtration system, a configuration of connecting a plurality of modules in parallel has been commonly employed (see, for example, Patent Literature (PTL) 1). In a membrane filtration system with such a configuration, the ease of flow of the flushing fluid is ununiform among a plurality of modules connected in parallel, resulting in variations in the cleaning effect obtained among the modules.

CITATION LIST

Patent Literature

PTL 1: JP6362748 (B1)

SUMMARY

An aspect of a cleaning method of a membrane filtration system is a cleaning method of a membrane filtration system including: backwashing in which backwash water is allowed to flow to a plurality of modules, wherein the plurality of modules, including an inlet side region and an outlet side region separated by a filtration membrane, are connected in parallel by a common blow header pipe in the inlet side region; and blowing in which gas is introduced into the plurality of modules through the blow header pipe after backwashing is started, the method further including, before blowing is started, forming a gas layer across the entire longitudinal direction of the blow header pipe.

DETAILED DESCRIPTION

An embodiment of the present disclosure will be described in detail below with reference to the drawings. It should be noted that, in each drawing, the same reference sign is assigned to the same component.

A membrane filtration system to which a cleaning method of a membrane filtration system according to the present disclosure can be applied is not particularly limited, and can be used for separating and removing contaminants in the water to be treated in various kinds of water treatment processes such as water treatment, sewage treatment, industrial water treatment, wastewater treatment, and seawater desalination.

The inventors have diligently studied for a purpose of obtaining a sufficiently uniform cleaning effect for a plurality of modules in a membrane filtration system including a plurality of modules connected in parallel. Then, the inventors have focused on the fact that, when a membrane filtration system configured by connecting a plurality of modules including an inlet side region and an outlet side region separated by a filtration membrane in parallel is backwashed and further, gas such as air is supplied to the inlet side region, the raw water present in a blow header pipe acts as a resistance to air supply, resulting in a reduction in the efficiency of air supply. More specifically, the inventors have focused on the fact that the raw water present in the blow header pipe acts as a resistance to air supply, causing the amount of gas flowing to the modules with relatively low resistance (e.g. modules located near the air supply inlet) to be larger than that flowing to the other modules, resulting in variation in the blowing effect obtained among modules. Then, the inventors have found that forming a gas layer in the blow header pipe before air is supplied to the inlet side region can improve the uniformity of the amount of gas flowing into each of the plurality of modules, and have completed the membrane filtration system according to this example.

(Schematic Configuration of Membrane Filtration System)

First, before describing a cleaning method of a membrane filtration system according to this example, a schematic configuration of the membrane filtration system that can perform the cleaning method according to this example will be described with reference to FIG. 7. A membrane filtration system 100 illustrated in FIG. 7 comprises a plurality of modules 10 including an inlet side region and an outlet side region separated by a filtration membrane (not illustrated) and a common blow header pipe 20 configured to connect the plurality of modules 10 in the inlet side region of the plurality of modules 10. Furthermore, the membrane filtration system 100 illustrated in FIG. 7 further comprises a water to be treated supply header pipe 30 configured to supply water to be treated from the inlet side region to the plurality of modules 10 and a filtered water header pipe 40 configured to discharge the filtered water obtained by passing through the filtration membrane provided in the plurality of modules 10 out of the system.

Figure 7:
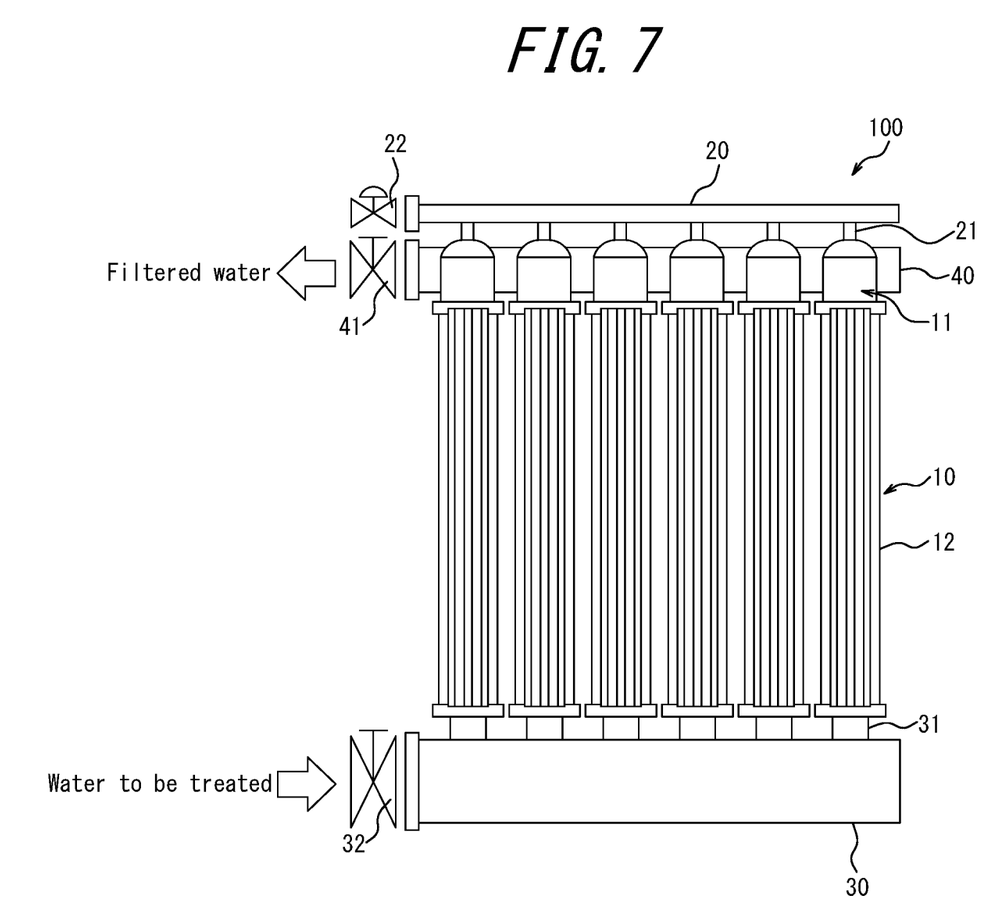
FIG. 7 illustrates an example of a schematic configuration of a membrane filtration system capable of performing a cleaning method according to the present disclosure.

Furthermore, in the membrane filtration system 100 illustrated in FIG. 7, the plurality of modules 10 may each comprise a membrane cap 11. Further, the number of modules 10 is not limited to the number illustrated in FIG. 7 (6 pieces). Moreover, the blow header pipe 20 common to the plurality of modules 10 includes blow header pipe connecting portions 21 connected respectively to the modules 10 (in FIG. 7, the membrane cap 11 provided to each module 10) and a blow valve 22. It should be noted that, although not illustrated, the blow valve 22 can be provided to the piping that can act as an air supply pipe configured to supply air into the blow header pipe 20 and a drain pipe for discharging water to be treated that flows into the blow header 20. Furthermore, the water to be treated supply header pipe 30 includes a water to be treated supply header pipe connecting portion 31 connected to each module 10 and a water to be treated valve 32. Then, the filtered water header pipe 40 is connected to each module 10 and includes a filtered water valve 41. Connection of the filtered water header pipe 40 to each module 10 can be configured by a filtered water port (not illustrated) connected to the upper portion of each module 10 in the vertical direction.

Each of the plurality of modules 10 may further have a plurality of sub-modules 12. The number of such sub-modules 12 is not limited to the example illustrated, and may be 10 pieces, for example. Then, the sub-module 12 may have a membrane element, which is a component element that includes a filtration membrane not illustrated. Such a membrane element may have a cell therein that has a diameter of several mm (for example, 2.5 mm) and acts as a fluid path. Such a membrane element is not particularly limited, and a monolithic module, a tubular module, a hollow fiber module, or the like, can be employed. Explanation is given below by assuming that the membrane element includes a monolithic ceramic filtration membrane.

The membrane filtration system 100 illustrated in FIG. 7 can be in a state in which all of the structures related to the filtration treatment is filled with water to be treated or filtered water during filtration (i.e. during filtrating). More specifically, the inlet side region of the membrane filtration system 100 is filled with water to be treated, and the outlet side region is filled with filtered water. The water to be treated supplied from the water to be treated supply header pipe 30 to the inlet side region of the plurality of modules 10 seeps to the outlet side region through the filtration membrane (not illustrated) to become filtered water, is collected in the outlet side region, after that, is transferred to the filtered water header pipe 40 and then is discharged out of the system. In the state illustrated in FIG. 7, in the membrane filtration system 100, the blow valve 22 is closed, and thus water to be treated does not flow out of the blow header pipe 20.

In FIG. 7, an exemplary aspect is illustrated in which, as with the blow header pipe 20, the water to be treated supply header pipe 30 and the filtered water header pipe 40 are common to the plurality of modules 10. However, the membrane filtration system capable of performing some cleaning methods illustrated below are not limited to the aspect illustrated in FIG. 7, and the water to be treated supply header pipe 30 and the filtered water header pipe 40 do not have to be connected to all of the modules 10, as illustrated, and separate water to be treated supply pipe and filtered water pipe may be connected to each module 10, as well as various valves that can be attached to these pipes may be connected.

Further, FIG. 7 illustrates a configuration in which one end of the blow header pipe 20 is provided with the blow valve 22, and the end can act as an air supply port. However, the position of the blow valve 22, that is, the position of the air supply port of the blow header pipe 20, is not particularly limited, and may be any position. For example, there is no longitudinal end of the blow header pipe 20, and an air supply pipe (not illustrated) with the blow valve 22 may be connected to the center or the other middle regions.

Similarly, with respect to the water to be treated supply header pipe 30, there is no longitudinal end, and a water to be treated supply pipe (not illustrated) with the water to be treated valve 32 may be connected to the center or the other middle regions.

Furthermore, the relative positional relationship between the position of the air supply port of the blow header pipe 20 and the connecting position of the water to be treated supply pipe with respect to the water to be treated supply header pipe 30 is not particularly limited, and may be any positional relationship.

A cleaning method of a membrane filtration system capable of being performed by the membrane filtration system having a schematic configuration illustrated in FIG. 1 will be described below with reference to FIGS. 1-4.

For clarity, some of the reference signs illustrated in FIG. 7 may not be illustrated in FIGS. 1-4.

(Cleaning Method of Membrane Filtration System)

Figure 1A:
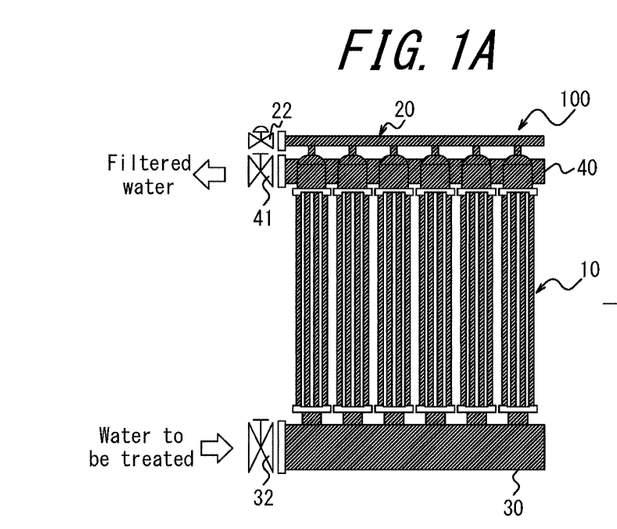
FIG. 1A illustrates an example of a cleaning method of a membrane filtration system according to the present disclosure.
Figure 1B:
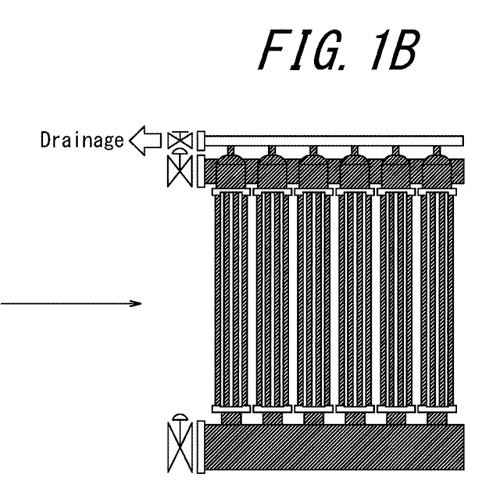
FIG. 1B illustrates an example of a cleaning method of a membrane filtration system according to the present disclosure.
Figure 1C:
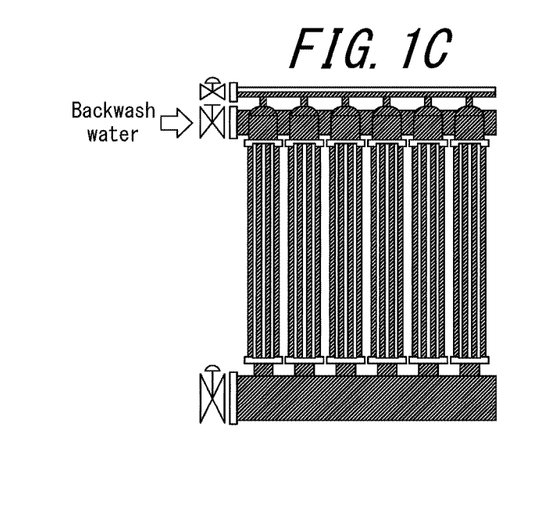
FIG. 1C illustrates an example of a cleaning method of a membrane filtration system according to the present disclosure.
Figure 1D:
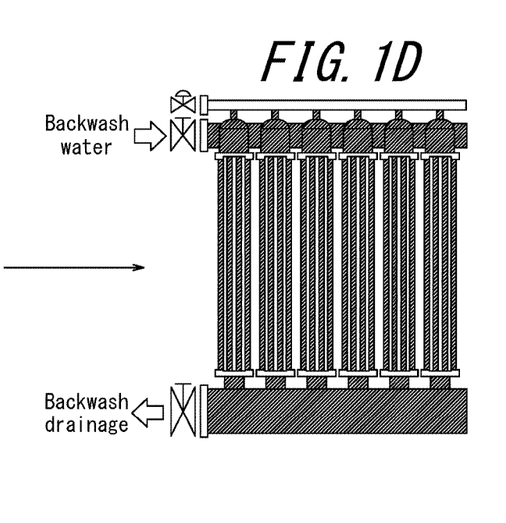
FIG. 1D illustrates an example of a cleaning method of a membrane filtration system according to the present disclosure.
Figure 2A:
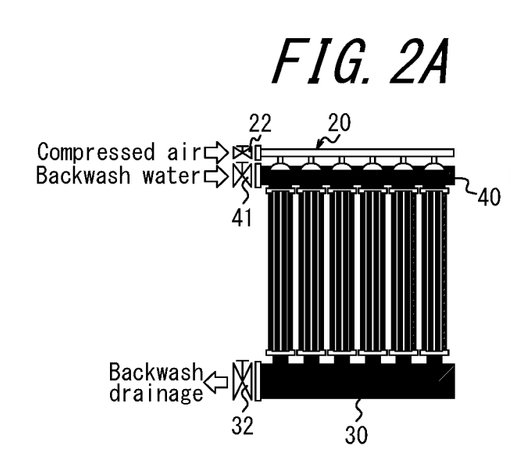
FIG. 2A illustrates an example of a cleaning method of a membrane filtration system according to the present disclosure following FIG. 1.

FIGS. 1A-1D and FIGS. 2A-2E illustrate an example of a cleaning method of a membrane filtration system according to the present disclosure. FIGS. 1A-1D and FIGS. 2A-2D illustrate the state from the final phase of the filtrating (FIG. 1A) to the end point of the blowing (FIG. 2E) in a step-by-step manner. For clarity, only FIGS. 1A and 2A are illustrated with reference signs, and reference signs are omitted in FIGS. 2B-2E.

FIG. 1A illustrates the membrane filtration system 100 during the filtrating. The membrane filtration system 100 in the state illustrated in FIG. 1A is assumed to finish the filtrating soon. Then, as illustrated in FIG. 1B, the water to be treated valve 32 and the filtered water valve 41 are closed, the blow valve 22 is opened, and the water to be treated is drained from the blow header pipe 20 to form a gas layer in the blow header pipe 20 (a step of forming a gas layer by drainage). In this manner, before the blowing described later is started, a gas layer is formed across the entire connection direction of the plurality of modules 10 in the blow header pipe 20, which enables introduction of air uniformly to the plurality of modules 10 connected in parallel to each other. As a result, cleaning effects obtained by backwashing can be uniformed for the plurality of modules 10. Furthermore, as illustrated in FIG. 1B, when a gas layer is formed in the blow header pipe 20 at the timing after completion of the filtrating and before start of the backwashing, a gas layer can be formed across the entire connection direction of the plurality of modules more reliably, compared with the case where a gas layer is formed at a timing later than the above described timing. As a result, the cleaning effect obtained by backwashing can be sufficiently uniformed more reliably.

In FIG. 1B, the blow header pipe 20 is empty, which illustrates a gas layer extending across the entire connection direction of the plurality of modules 10 extends substantially across the entire region of the blow header pipe 20. However, the cleaning method according to this example is not limited to the aspect illustrated. More specifically, the gas layer may only need to extend across the entire connection direction of the plurality of modules 10, and, for example, may extend above a water to be treated layer, which is left in the vertically lower region of the membrane filtration system 100 in the blow header pipe 20. The water level of the water to be treated layer in the blow header pipe 20 can be reliably controlled, for example, by adjusting the time during which the blow valve 22 is open, either manually or by automatic control using a timer. As a result, a gas layer of a desired volume can be reliably formed in the blow header pipe 20.

FIG. 1C illustrates a state of the membrane filtration system 100 immediately after the backwashing is started. In the backwashing, the filtered water valve 41 is opened, and at the same time, the backwash water pressurized by a backwash pressurization mechanism (not illustrated) is allowed to flow in the direction opposite to the filtration direction. The backwash water can be a part of the filtered water obtained in the filtrating, and can be stored in a backwash water tank, or the like, not illustrated. Further, the backwash pressurization mechanism (not illustrated) is not particularly limited, and may be mounted, for example, by a backwash pump, or the like.

In the backwashing, immediately after the start of the backwashing, first, in order to apply pressure from the outlet side region to the inlet side region for the purpose of separating the contaminants adhered to the surface facing the inlet side region of the filtration membrane in the modules 10, the pressurized backwash water is allowed to flow back through the filtered water header pipe 40 into the plurality of modules 10 while the blow valve 22 and the water to be treated valve 32 are closed. Therefore, in the state illustrated in FIG. 1C, as the pressure in the membrane filtration system 100 increases, the gas layer formed in the blow header pipe 20 is once compressed at the stage illustrated in FIG. 1B, thus its volume is reduced. As illustrated in FIG. 1C, a temporary state in the backwashing, that is, a state in the backwashing where the filtrate valve 41 is opened, but the blow valve 22 and the water to be treated valve 32 are closed, and the inflow of pressurized backwash water causes high pressure in the membrane filtration system 100 can also be referred to as a backwash pressurization step.

FIG. 1D illustrates a step in which, after the backwash pressurization step illustrated in FIG. 1C, the water to be treated valve 32 is opened to allow the backwash water to flow in the inlet side region to obtain backwash drainage containing contaminants separated in the backwash pressurization step (backwash drainage outflow step). In the backwash drainage outflow step, the contaminants separated from the filtration membrane is washed away and removed. Further, in the backwash drainage outflow step, the pressure in the membrane filtration system 100 decreases, and thus the water to be treated flowed in the blow header pipe 20 again flows out of the blow header pipe 20, and the blow header pipe 20 may be emptied again.

FIG. 2A illustrates the state of the membrane filtration system 100 immediately after the start of the blowing. At the start of the blowing, the blow valve 22 is opened, and compressed gas (for example, compressed air) pressurized by a blow mechanism (not illustrated) flows into the blow header pipe 20. As described above, a gas layer across the entire connection direction of the plurality of modules 10 is present in the blow header pipe 20 (empty state in the illustrated example). Therefore, when the compressed gas flows through the blow header pipe 20, the resistance is much smaller than the state in the blowing included in the cleaning method according to the conventional method in which the blow header pipe 20 is filled with water to be treated. Thus, compressed gas begins to flow between modules 10 at substantially the same timing, then the compressed gas is distributed to each module 10 substantially uniformly throughout the blowing and circulates each module 10. Therefore, variation in the cleaning effect among the plurality of modules 10 obtained as a result of the backwashing can be effectively suppressed.

Figure 2B:
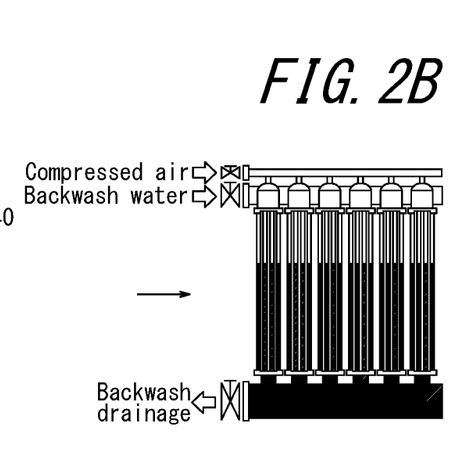
FIG. 2B illustrates an example of a cleaning method of a membrane filtration system according to the present disclosure following FIG. 1.

Further, as illustrated in FIG. 2B, for example, in a monolithic ceramic filtration membrane in which the longitudinal direction matches the vertical direction of the membrane filtration system 100, compressed gas is allowed to flow in the direction from the upper side in the vertical direction to the lower side in the vertical direction, and is mixed with water (water to be treated and/or backwash water) in the inlet side region in the module 10, then flows down in a gas-liquid mixed state. Also in this case, the same cleaning effect can be obtained in all of the modules, because there is very little variation in resistance among the plurality of modules 10 in the compressed gas flow path.

Figure 2C:
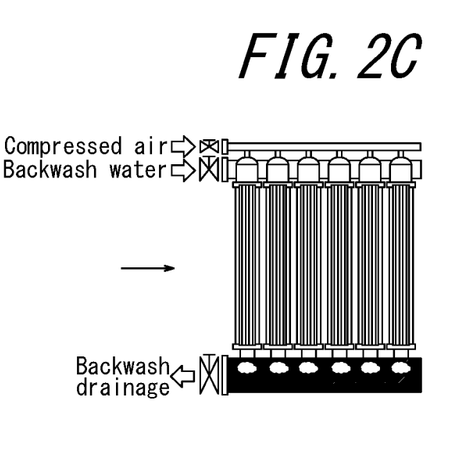
FIG. 2C illustrates an example of a cleaning method of a membrane filtration system according to the present disclosure following FIG. 1.
Figure 2D:
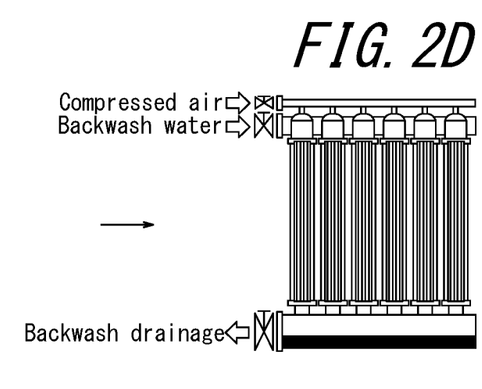
FIG. 2D illustrates an example of a cleaning method of a membrane filtration system according to the present disclosure following FIG. 1.
Figure 2E:
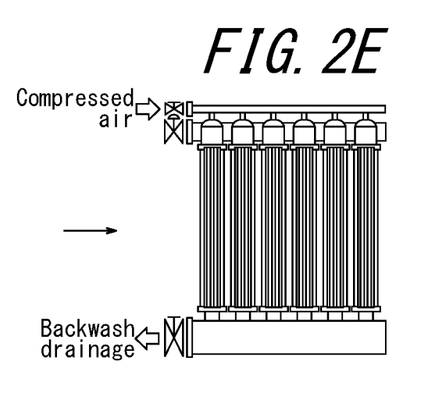
FIG. 2E illustrates an example of a cleaning method of a membrane filtration system according to the present disclosure following FIG. 1.

Then, as illustrated in FIG. 2C, gas and water (water to be treated and/or backwash water) flow into the water to be treated supply header pipe 30 from the plurality of modules 10 while being in a gas-liquid mixed state. Next, as illustrated in FIG. 2D, the backwash drainage is discharged from the water to be treated supply header pipe 30. Furthermore, as illustrated in FIG. 2E, the filtered water valve 41 is closed, and after all backwash drainage is discharged from the water to be treated supply header pipe 30, compressed gas is supplied from the blow header pipe 20 for a few seconds, and is exhausted from the water to be treated supply header pipe 30. After a few seconds of air supply, the blowing is completed.

As described above, according to the cleaning method of an example described with reference to FIGS. 1-2, the cleaning effect obtained by backwash can be sufficiently uniformed among the plurality of modules connected in parallel. The cleaning method according to some other examples will be described below with reference to FIGS. 3-4.

Figure 3A:
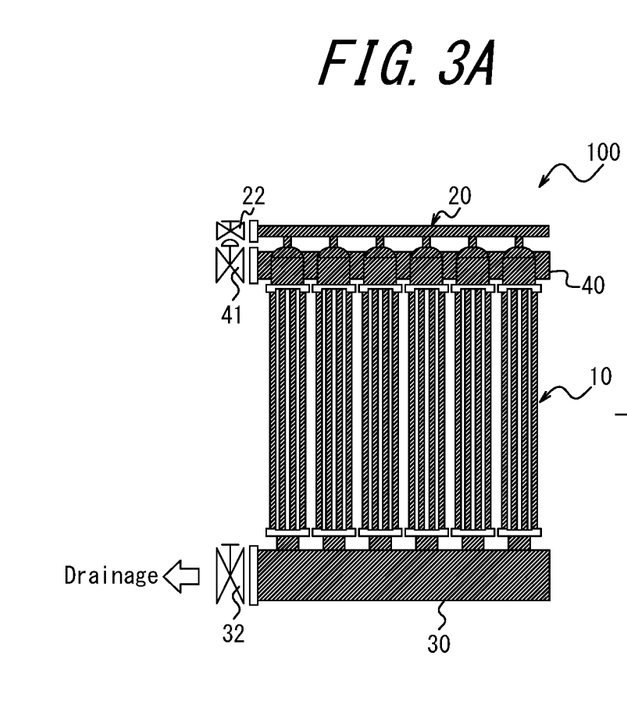
FIG. 3A illustrates an operation for forming a gas layer in another example of a cleaning method of a membrane filtration system according to the present disclosure.
Figure 3B:
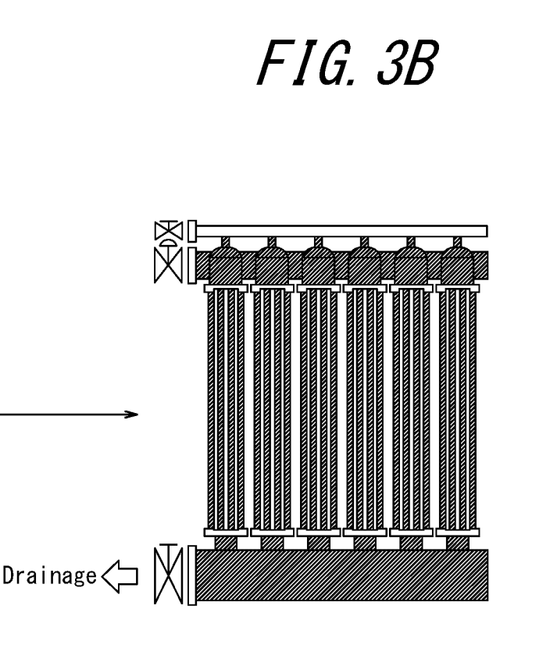
FIG. 3B illustrates an operation for forming a gas layer in another example of a cleaning method of a membrane filtration system according to the present disclosure.

FIGS. 3A-3B are diagrams for illustrating an operation for forming a gas layer in another example of the cleaning method of a membrane filtration system according to the present disclosure. The cleaning method according to this example is different from the cleaning method described with reference to FIGS. 1-2 in that, a gas layer is formed by lowering the water level in the blow header pipe 20 by opening the water to be treated valve 32 of the water to be treated supply header pipe 30 to discharge the water to be treated contained in the inlet side region of the modules 10 from the water to be treated supply header pipe 30, not by opening the blow valve 22 to directly discharge from the blow header pipe 20. For clarity, only FIG. 3A is illustrated with reference signs, and reference signs are omitted in FIG. 3B.

As illustrated in FIG. 3A, after the filtrating is finished, the blow valve 22 and the water to be treated valve 32 are opened to perform an operation to drain the water to be treated from the water to be treated supply header pipe 30 (a gas layer formation step by drainage). With this operation, as illustrated in FIG. 3B, the water level in the blow header pipe 20 is lowered (in the example, the water level is zero), and a gas layer is formed across the entire connection direction of the plurality of modules 10. At this time, the water level in the blow header pipe 20 can be controlled to a desired water level by adjusting the time during which the blow valve 22 and the water to be treated valve 32 are opened. The control may be performed manually or by automatic control using a timer or the like. If a gas layer is formed by discharging the water to be treated held in the blow header pipe 20, a gas layer can be formed more reliably across the entire connection direction of the plurality of modules 10, and as a result, the cleaning effect obtained by backwashing can be uniformed more reliably.

Then, the backwashing after formation of a gas layer can be performed in the same manner as the aspect described with reference to FIGS. 1C-FIG. 2E.

Figures 4A, 4B:
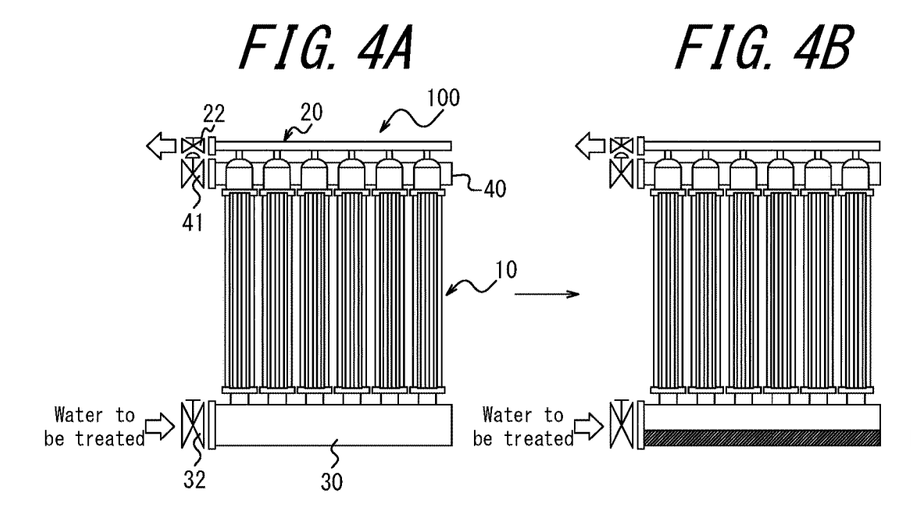
FIG. 4A illustrates an operation for forming a gas layer in still another example of a cleaning method of a membrane filtration system according to the present disclosure.
FIG. 4B illustrates an operation for forming a gas layer in still another example of a cleaning method of a membrane filtration system according to the present disclosure.

FIGS. 4A-4E illustrate an operation for forming a gas layer in still another example of the cleaning method of the membrane filtration system according to the present disclosure. The cleaning method according to this example is different from various cleaning methods described with reference to FIGS. 1-3 in that the operation for forming a gas layer is performed in the filtrating. For clarity, only FIG. 4A is illustrated with reference signs, and reference signs are omitted in FIGS. 4B-4E.

Figure 4C:
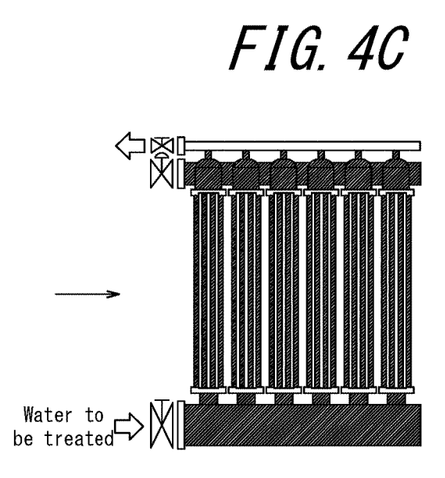
FIG. 4C illustrates an operation for forming a gas layer in still another example of a cleaning method of a membrane filtration system according to the present disclosure.

FIG. 4A illustrates a state at the time of starting the filtrating. In the membrane filtration system 100 in that state, the water to be treated valve 32 and the blow valve 22 are open, and as illustrated in FIGS. 4B-4C, a water filling operation is performed, in which water to be treated is allowed to flow in the plurality of modules 10 from the inlet side region through the water to be treated valve 32 and the water to be treated supply header pipe 30. Then, as illustrated in FIG. 4C, immediately before the water to be treated reaches inside the blow header pipe 20, or even if the water to be treated reaches inside the blow header pipe 20, the water filling operation is stopped at the timing when the gas layer across the entire connection direction of the plurality of modules 10 is held in the blow header pipe 20. When the water filling operation is stopped, the blow valve 22 is closed. When the water filling operation is stopped, the blow valve 22 may be closed after stopping supply of water to be treated. In this case, when the filtrating is started, it is necessary to start supply of water to be treated again. If a gas layer is formed in the blow header pipe 20 by adjusting the timing at which the water filling operation is stopped in the filtrating, it is not necessary to perform an additional operation for forming a gas layer. Thus, efficiency of the cleaning method of the filtration system according to the present disclosure can be improved.

Figure 4D:
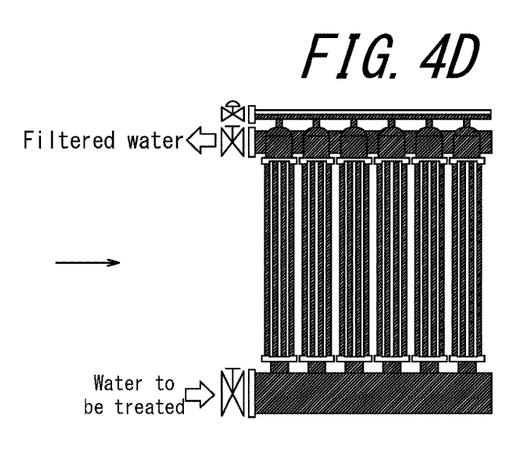
FIG. 4D illustrates an operation for forming a gas layer in still another example of a cleaning method of a membrane filtration system according to the present disclosure.
Figure 4E:
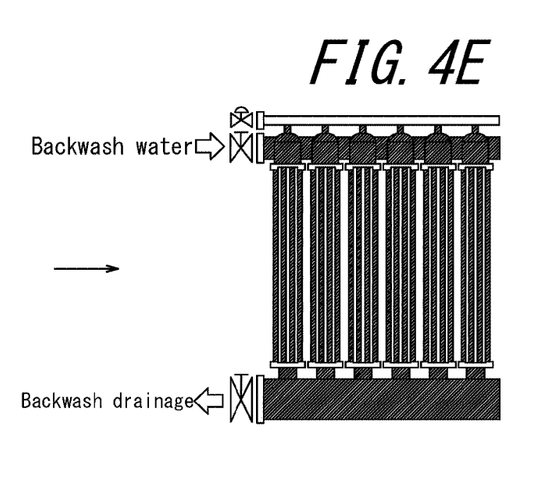
FIG. 4E illustrates an operation for forming a gas layer in still another example of a cleaning method of a membrane filtration system according to the present disclosure.

After that, the filtered water valve 41 is opened to perform a filtration operation for allowing the filtered water to flow out of the filtered water header pipe 40. In this case, as illustrated in FIG. 4D, the gas layer in the blow header pipe 20 is compressed and the volume thereof can be reduced. However, as illustrated in FIG. 4E, if the backwash drainage outflow step of the backwashing is started, the pressure in the membrane filtration system 100 is reduced, and the blow header pipe 20 may be emptied again. Operation in the subsequent backwashing is as illustrated in FIGS. 2A-2E.

As described above, various cleaning methods that can be performed by the membrane filtration system 100 having the configuration schematically illustrated in FIG. 7 have been described with reference to FIGS. 1 to 4 and FIG. 7. An example of the schematic structure of the membrane filtration system of the present disclosure and an example of the cleaning method of the present disclosure when such a membrane filtration system is used will be described below with reference to FIGS. 5A to 5E.

Figure 5A:
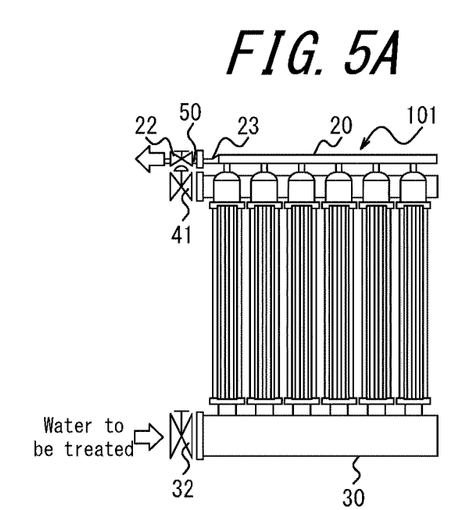
FIG. 5A illustrates an example of a schematic structure of a membrane filtration system according to the present disclosure and an example of a cleaning method according to the present disclosure when the membrane filtration system is used.

A membrane filtration system 101 illustrated in FIG. 5A is different from the membrane filtration system 100 described with reference to FIG. 7 in that the blow header pipe 20 is connected, through a variant reducer 23 as a reducer of a predetermined shape, to a pipe 50 that can serve as a drain pipe and an air supply pipe. It is required for the variant reducer 23 that the cross-sectional area of the end on the blow header pipe 20 side is larger than that of the end on the pipe 50 side of the variant reducer 23. Furthermore, it is required for the variant reducer 23 that the upper end position of the end on the blow header pipe 20 side is located above the upper end position of the end on the pipe 40 side of the variant reducer 23 in the vertical direction of the membrane filtration system 101. If the variant reducer 23 in such a special shape and the blow header pipe 20 are communicated to each other, water does not stay in the portion (region) in the blow header pipe 20 that is higher in the vertical direction than the upper end position on the pipe 50 side of the variant reducer 23, as long as the blow valve 22 provided to the pipe 50 is in the open state, and thus a gas layer can be formed successfully. Thus, a gas layer across the entire connection direction of the plurality of modules 10 can be formed more reliably in the blow header pipe 20. Therefore, a sufficiently uniform backwash effect can be obtained among a plurality of modules connected in parallel to each other. The shape of the variant reducer 23 will be described later with reference to FIG. 6.

The state from implementation of the filtrating by using the membrane filtration system 101 having such a configuration to the start of the backwashing will be schematically described with reference to FIGS. 5B-5E. For clarity, the reference signs will be omitted in FIGS. 5B-5E.

Figure 5B:
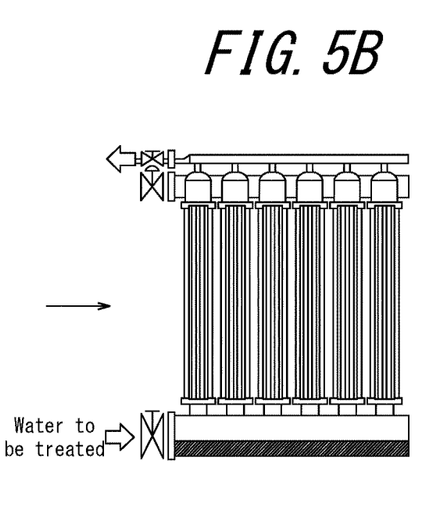
FIG. 5B illustrates an example of a schematic structure of a membrane filtration system according to the present disclosure and an example of a cleaning method according to the present disclosure when the membrane filtration system is used.
Figure 5C:
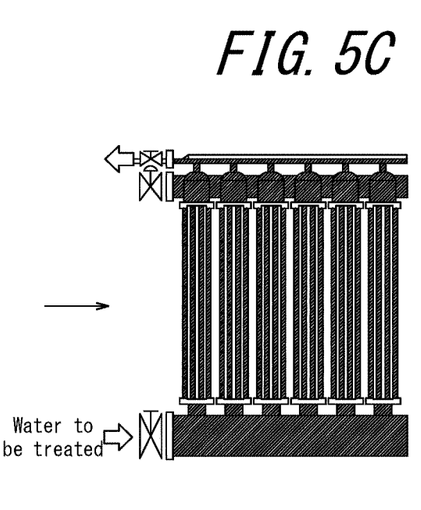
FIG. 5C illustrates an example of a schematic structure of a membrane filtration system according to the present disclosure and an example of a cleaning method according to the present disclosure when the membrane filtration system is used.

FIG. 5B illustrates a state at the time when the filtrating is started. In the membrane filtration system 101 in such a state, the water to be treated valve 32 and the blow valve 22 are open, and as illustrated in FIGS. 5B-5C, a water filling operation in which the water to be treated is allowed to flow into the plurality of modules 10 from the inlet side region through the water to be treated valve 32 and the water to be treated supply header pipe 30 is performed. Then, as illustrated in FIG. 5C, even if the water to be treated reaches inside the blow header pipe 20, a gas layer across the entire connection direction of the plurality of modules 10 is held in the blow header pipe 20. This is because, as long as the blow valve 22 is open, the water to be treated does not stay in the part (region) higher than the upper end position on the pipe 50 side of the variant reducer 23 in the vertical direction. In this manner, according to the membrane filtration system 101, the blow header pipe 20 can be structurally avoided from being filled with the water to be treated.

Figure 5D:
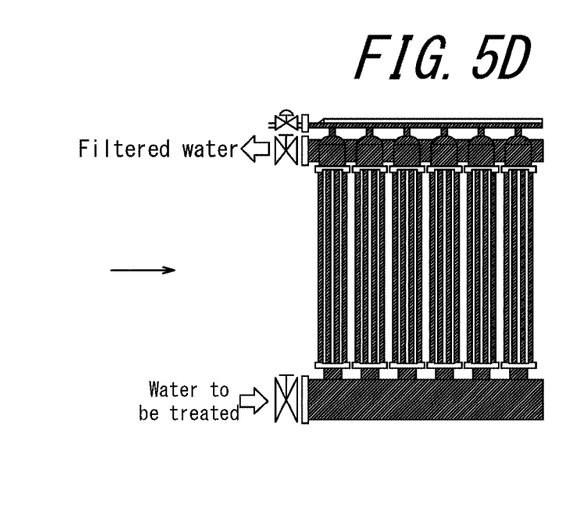
FIG. 5D illustrates an example of a schematic structure of a membrane filtration system according to the present disclosure and an example of a cleaning method according to the present disclosure when the membrane filtration system is used.
Figure 5E:
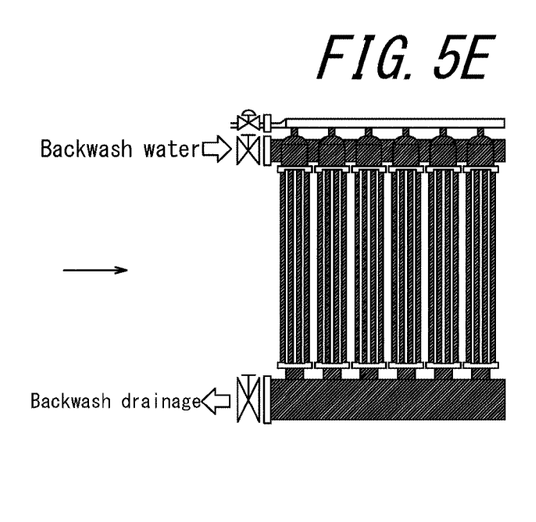
FIG. 5E illustrates an example of a schematic structure of a membrane filtration system according to the present disclosure and an example of a cleaning method according to the present disclosure when the membrane filtration system is used.

Then, as illustrated in FIG. 5D, at the start of the filtrating, the blow valve 22 is closed and the filtered water valve 41 is opened to allow the filtered water to flow out of the system. In this case, the gas layer in the blow header pipe 20 can be compressed and shrunk due to an increase in the internal pressure of the membrane filtration system 101. However, as illustrated in FIG. 5E, if the filtrating is finished and the backwashing is started, the internal pressure of the membrane filtration system 101 decreases, and accordingly, the pressure in the blow header pipe 20 decreases, the water level in the blow header pipe 20 decreases, then further the blow header pipe 20 can be emptied.

In a cleaning method using the membrane filtration system 101, an operation for forming a gas layer described with reference to FIG. 1B or 3A, that is, "a gas layer forming step by drainage" through the blow header pipe 20 or the water to be treated supply header pipe 30 may be performed. However, as described above, the membrane filtration system 101 can structurally avoid the water to be treated to be filled in the blow header pipe 20. Thus, "a state in which a gas layer across the entire connection direction of the plurality of modules 10 is held in the blow header pipe 20" can be created without needing implementation of the gas layer formation step by drainage and stop of water filling operation before the blow header pipe 20 is filled with water as described above. In this manner, according to the membrane filtration system comprising a reducer having a predetermined shape, a gas layer can be formed easily without requiring special controls.

Figure 6:
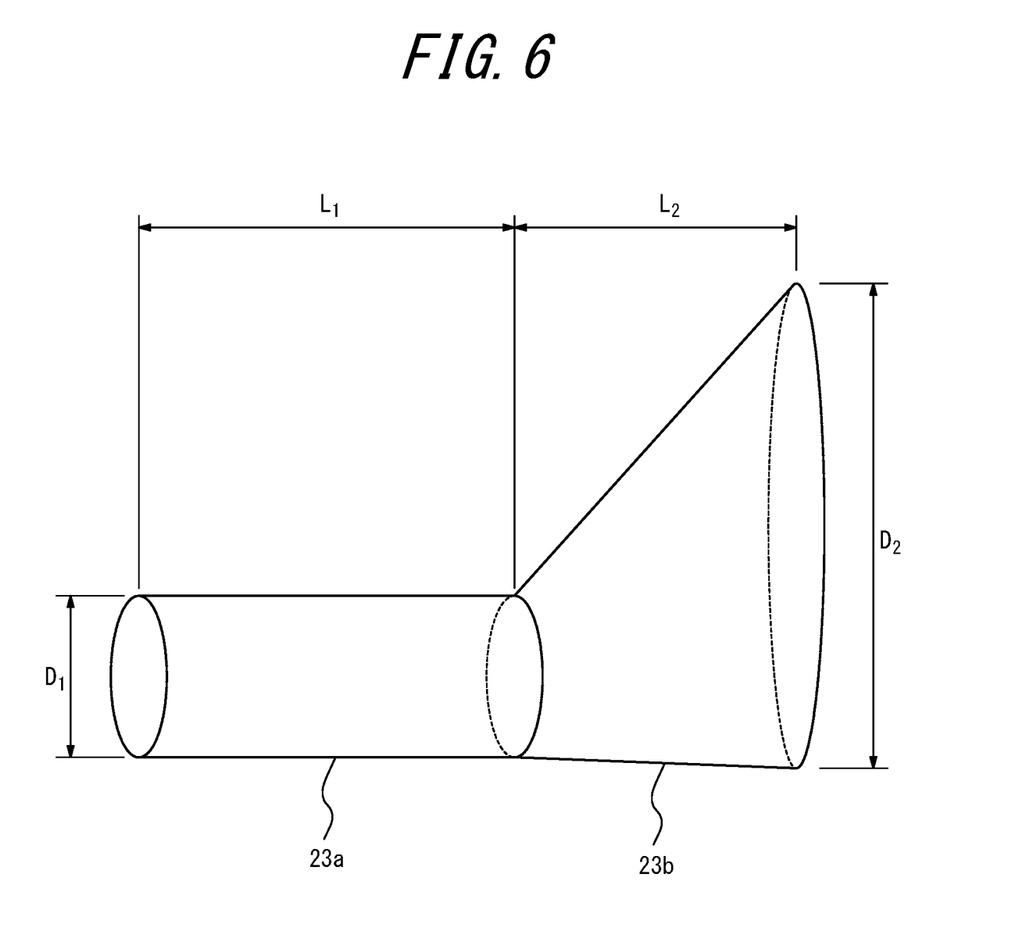
FIG. 6 is a schematic diagram illustrating an example of a shape of a variant reducer.

Here, an example of a shape of the variant reducer 23 will be described with reference to FIG. 6. As illustrated schematically in FIG. 6, the variant reducer 23 has a small diameter portion 23a with a constant pipe diameter and an eccentric tapered portion 23b. Then the ratio of the pipe diameter (inner diameter) $D_2$ at the open end of the eccentric tapered portion 23b to the pipe diameter (inner diameter) $D_1$ of the small diameter portion 23a, $D_1:D_2$, is about 1:2 to 1:4, preferably about 1:3. Furthermore, the ratio of the length $L_1$ of the small diameter portion 23a in the axial direction to the length $L_2$ of the eccentric tapered portion 23b, $L_1:L_2$, is about 1:2 to 2:1, preferably about 4:3. The length $L_2$ of the eccentric taper portion 23b is not the length of the eccentric tapered portion 23b in the eccentric axis direction, but the length of the eccentric tapered portion 23b as measured in the axial direction of the small diameter portion 23a. Further, the length $L_1$ of the small diameter portion 23a in the axial direction is not particularly limited, and can be 10 cm or less, for example. Further, although not illustrated, the variant reducer 23 may have a flange, or the like, that can be a connecting portion to the other component element.

Then, when the variant reducer 23 is mounted on the membrane filtration system 101, it is mounted in such a manner that the upper end of the eccentric tapered portion 23b is positioned higher than the upper end of the small diameter portion 23a in the vertical direction of the membrane filtration system 101. As a result, the region in the blow header pipe 20 located higher than the upper end position of the small diameter portion 23a will not be filled with water as long as the blow valve 22 is in an open state.

REFERENCE SIGNS LIST

10 Module
11 Membrane cap
12 Sub-module
20 Blow header pipe
21 Blow header pipe connecting portion
22 Blow valve
23 Variant reducer
23a Small diameter portion
23b Eccentric tapered portion
30 Water to be treated supply header pipe
31 Water to be treated supply header pipe connecting portion
32 Water to be treated valve
40 Filtered water header pipe
41 Filtered water valve
50 Pipe
100, 101 Membrane filtration system

The invention claimed is:
1. A cleaning method of a membrane filtration system, wherein the membrane filtration system comprises:
   a plurality of modules including an inlet side region and an outlet side region separated by a filtration membrane;

a blow header pipe commonly and parallelly connected to each of the inlet side regions of the plurality of modules; and a filtered water header pipe for discharging filtered water obtained by passing through the filtration membrane of the plurality of modules to an outside of the system; and the cleaning method of the membrane filtration system comprises:

a filtration step of filling water to be treated into each of the plurality of modules, allowing the water to be treated to flow into the blow header pipe, and discharging the filtered water from the filtered water header pipe to the outside of the system;

a gas layer formation step of, after completion of the filtration step, discharging the water to be treated inside the blow header pipe to the outside of the system to form a gas layer extending over the entire connection direction of the plurality of modules inside the blow header pipe;

a backwashing step of, after the gas layer formation step, flowing backwash water into the plurality of modules via the filtered water header pipe; and a blowing step of, after the start of the backwashing step, introducing compressed gas into the plurality of modules through the blow header pipe wherein the membrane filtration system further comprises a blow header pipe connecting portion connected to each of the plurality of modules, and the filtration step comprises allowing the water to be treated to flow into the blow header pipe via the blow header pipe connecting portion;

wherein the membrane filtration system further comprises: a blow valve provided in the blow header pipe; a filtered water valve provided in the filtered water header pipe; a water to be treated supply header pipe connected to each of the plurality of modules; and a water to be treated valve provided in the water to be treated supply header pipe, and in the filtration step, the filtered water valve is opened to discharge the filtered water from the filtered water header pipe to the outside of the system, at the end of the filtration step, the blow valve is closed, and the water to be treated is retained in the blow header pipe, and in the gas layer formation step, the closed blow valve and the closed water to be treated valve are opened to discharge the water to be treated from the water to be treated supply header pipe to the outside of the system and to form a gas layer extending over the entire connection direction of the plurality of modules inside the blow header pipe;

wherein the backwashing step, the open blow valve is closed, and the closed filtered water valve is opened to flow backwash water through the filtered water header pipe, and in the blowing step, the closed blow valve is opened to introduce compressed gas into the plurality of modules through the blow header pipe.

2. The cleaning method of a membrane filtration system according to claim 1, wherein the membrane filtration system further comprises a blow valve provided in the blow header pipe and a filtered water valve provided in the filtered water header pipe, in the filtration step, the filtered water valve is opened to discharge the filtered water from the filtered water header pipe to the outside of the system, at the end of the filtration step, the blow valve is closed, and the water to be treated is retained in the blow header pipe, and in the gas layer formation step, the opened filtered water valve is closed, and the closed blow valve is opened to discharge the water to be treated inside the blow header pipe to the outside of the system and to form a gas layer extending over the entire connection direction of the plurality of modules inside the blow header pipe.

3. The cleaning method of a membrane filtration system according to claim 2, wherein in the backwashing step, the opened blow valve is closed, and the closed filtered water valve is opened to flow backwash water through the filtered water header pipe, and in the blowing step, the closed blow valve is opened to introduce compressed gas into the plurality of modules through the blow header pipe.

4. The cleaning method of a membrane filtration system according to claim 3, wherein the membrane filtration system further comprises a water to be treated supply header pipe connected to each of the plurality of modules and a water to be treated valve provided in the water to be treated supply header pipe, in the backwashing step, first, the blow valve and the water to be treated valve are closed, a backwash pressurization step is performed in which, with the filtered water valve open, pressurized backwash water is introduced into the plurality of modules through the filtered water header pipe; and after the backwash pressurization step, and a backwash drainage discharge step is performed in which the closed water to be treated valve is opened to discharge the backwash water to the outside of the system via the water to be treated supply header pipe.

5. The cleaning method of a membrane filtration system according to claim 1, wherein the membrane filtration system further comprises:

a blow valve provided in the blow header pipe;

a filtered water valve provided in the filtered water header pipe;

a water to be treated supply header pipe connected to each of the plurality of modules; and a water to be treated valve provided in the water to be treated supply header pipe, and at the start of the filtration step, the water to be treated valve and the blow valve are opened, and the water to be treated is introduced into the plurality of modules from the inlet side region via the water to be treated valve and the water to be treated supply header pipe; and wherein even when the water to be treated reaches the inside of the blow header pipe, the blow valve is closed at a timing when a gas layer extending over the entire connection direction of the plurality of modules remains inside the blow header pipe, thereby stopping the inflow of the water to be treated and forming the gas layer over the entire connection direction of the plurality of modules.

6. The cleaning method of a membrane filtration system according to claim 5, wherein in the backwashing step, the open blow valve is closed, and the closed filtered water valve is opened to flow backwash water through the filtered water header pipe, and in the blowing step, the closed blow valve is opened to introduce compressed gas into the plurality of modules through the blow header pipe.

7. The cleaning method of a membrane filtration system according to claim 1, wherein the blow header pipe is filled with the water to be treated in the filtration step.

* * * * *